United States Patent
Catena (10) Patent No.: US 8,978,593 B2
(45) Date of Patent: Mar. 17, 2015

(54) LEASH FOR DOGS OR OTHER DOMESTIC ANIMALS

(75) Inventor: Rocco Catena, Pescara (IT)

(73) Assignee: Primenove S.R.L., Pescara (IT)

( * ) Notice: Subject to any disclaimer, the term of this patent is extended or adjusted under 35 U.S.C. 154(b) by 254 days.

(21) Appl. No.: 13/509,147

(22) PCT Filed: Aug. 6, 2010

(86) PCT No.: PCT/IT2010/000360
§ 371 (c)(1),
(2), (4) Date: May 10, 2012

(87) PCT Pub. No.: WO2011/058588
PCT Pub. Date: May 19, 2011

(65) Prior Publication Data
US 2012/0222630 A1    Sep. 6, 2012

(30) Foreign Application Priority Data
Nov. 12, 2009    (IT) ................ CH2009A0028

(51) Int. Cl.
*B65H 75/34* (2006.01)
*A01K 27/00* (2006.01)

(52) U.S. Cl.
CPC .................... *A01K 27/004* (2013.01)
USPC ............. 119/796; 119/794; 119/797

(58) Field of Classification Search
CPC ............... A01K 27/00; B65H 75/368
USPC .......... 119/794–99; 242/385, 385.3, 385.4, 242/396, 396.1, 396.2, 396.3, 396.4, 405.2, 242/405.3
See application file for complete search history.

(56) References Cited

U.S. PATENT DOCUMENTS

| | | | | |
|---|---|---|---|---|
| 2,314,504 A * | 3/1943 | Lifchultz | ............ | 242/379.2 |
| 2,647,703 A * | 8/1953 | Hayes | ............ | 242/381.6 |
| 4,489,494 A * | 12/1984 | Duda | ............ | 33/767 |
| 2004/0154557 A1 | 8/2004 | Meissner | | |
| 2006/0201449 A1 | 9/2006 | DiDonato | | |
| 2011/0083617 A1 * | 4/2011 | Townsend et al. | ........... | 119/797 |

FOREIGN PATENT DOCUMENTS

DE    3912069 A1 * 10/1990 ............ A01K 27/00
DE    202007008699 U1   10/2007

(Continued)

OTHER PUBLICATIONS

English-language translation of DE 202007008699 U1.*

(Continued)

*Primary Examiner* — David Parsley
*Assistant Examiner* — Lisa Tsang
(74) *Attorney, Agent, or Firm* — Lowe Hauptman & Ham, LLP (57) ABSTRACT

A leash for domestic animals comprising a box-shaped body that houses a cord-winding pulley and a handle with open annular profile that ends at the free ends with rotational pins inserted from opposite sides in suitable housings obtained on the sides of a basically rectangular short pipe joined to said box-shaped body. The handle is provided with a button that stops and releases the pulley with the interposition of suitable return means. The handle is composed of two C-shaped semi-parts, each of them ending with one of said rotational pins at one end and with fast coupling and uncoupling mechanisms at the other end.

20 Claims, 5 Drawing Sheets

(56) References Cited

FOREIGN PATENT DOCUMENTS

| | | | | |
|---|---|---|---|---|
| EP | 464725 A1 | * | 1/1992 | ............. A01K 27/00 |
| EP | 1495675 A2 | | 1/2005 | |
| EP | 2095708 A2 | | 9/2009 | |
| GB | 2458668 A | * | 9/2009 | ............. A01K 27/00 |
| WO | 2004-105468 A2 | | 12/2004 | |

OTHER PUBLICATIONS

International Search Report for PCT/IT2010/000360 mailed Nov. 4, 2011.

* cited by examiner

LEASH FOR DOGS OR OTHER DOMESTIC ANIMALS

RELATED APPLICATIONS

The present application is a National Phase of International Application Number PCT/IT2010/000360, filed on Aug. 6, 2010, and claims priority from, Italian Application Number CH2009A000028, filed Nov. 12, 2009.

The present patent application for industrial invention relates to a leash with adjustable-length cord for dogs or other domestic animals.

The peculiarities and advantages of the invention will become more evident following to a short description of the prior art.

As it is known, dog leashes with adjustable-length cords have been available for a long time.

Similar leashes are composed of a basically circular box-shaped body molded from plastic materials, from the perimeter of which a rigid handle protrudes, in which the user can insert his hand and exert the force necessary to hold his dog.

Said box-shaped body contains a cord-winding device controlled by means of a button situated near the handle, in such a position to be easily actuated with the thumb of the hand that holds the handle.

Said cord-winding device of traditional type comprises a grooved roll is subject to the action of a return spring, the rotation of which can be stopped by the user by means of the external button.

The internal end of the cord is fixed inside the groove of said grooved roll in such a way that the cord can be wound and unwound with respect to said groove during inverse rotations of the roll.

If the user decides to let the dog move away, he simply needs to allow the dog cause the free rotation of the roll and consequently the progressive unwinding of the cord by means of traction.

Instead, when the user decides to oppose the animal's desire to move away, he simply needs to press the button in order to block the roll at end-of-travel position and stop the free rotation of the roll instantaneously.

The release of the button will unblock the roll and allow the dog to move away freely.

It must be noted that the free rotation of the roll must be also maintained when the user wants to recover the cord in order to reduce the distance from the dog.

Such a recovery can be obtained only when the dog is in static condition, that is to say when the force of the return spring associated with the roll does not exceed the animal's traction force and does not impose inverse rotation to the roll.

In spite of being very popular today, such a technology is impaired by severe functional drawbacks that mostly depend on the external box-shaped structure, which is provided with a handle in which the user can only insert his fingers.

The first of these functional limitations is related to the fact that the dog owner is forced to constantly use one of his hands to hold the dog, firmly holding the handle of the leash in order to control the animal and its freedom of movement.

Of course, such a requirement is a great limitation for the freedom of action of the dog owner who cannot use the hand that holds the leash for other purposes, such as reading the newspaper, holding a shopping bag or the bicycle handle.

It can be said that the user of such a traditional leash can never let the handle go, not even when he needs to use both hands and wants to "park" the dog outside a shop.

In fact, the box-shaped rigid structure with handle does not allow for fixing the leash, not even for a short period of time, to an extemporaneous fixing point, such as the post of a traffic light, the grille of a railing, the boards of a bench, and so on.

The impossibility to let the handle of a traditional leash go, including temporarily, creates an additional problem that mostly occurs during the cold months.

In fact, the user cannot put the hand used to hold the leash firmly in his pocket, thus being inevitably exposed with high discomfort to low temperatures.

The lateral tension due to the traction exerted by the animal that moves laterally with respect to the person holding the leash causes the rotation of the handle with respect to the palm, in such a way to generate friction and collisions on the knuckles.

Moreover, the constant use of such a traditional leash, with the consequent need to hold the handle firmly, causes the onset of significant pathologies for the user's muscles and joints of hand and wrist.

Starting from these critical evaluations of the prior art, the present invention intends to provide a leash still with adjustable-length cord that is actually able to remedy the aforementioned functional limitations.

To that end, the new leash of the invention comprises a box-shaped circular body that contains the traditional cord-winding roll, which is preferably molded from plastic materials.

However, in this case the box-shaped body does not incorporate the traditional rigid handle, in favor of a more effective and more versatile holding means obtained with molding.

Said holding means consists in a large tubular handle with open annular profile, with free ends pivoted on opposite sides into corresponding holes made on opposite sides on a basically rectilinear tubular short pipe obtained on the outside of a circumference section of said box-shaped body that contains the cord-winding roll.

It must be noted that the internal diameter of said basically circular handle is higher than the external diameter of the box-shaped body.

A first purpose of the present invention can be achieved, which consists in allowing the user to control the dog leash with high efficacy and practicalness.

First of all, the presence of an annular handle with large dimensions gives the user the possibility of holding the handle as desired in any point of its circumference.

Secondly, the presence of such an annular handle is the most suitable solution to allow the user of the leash of the invention to perfectly control his dog, while having both hands free.

Because of the width, said handle allows the user for inserting his forearm up to the elbow.

In such a way the user is sure that the leash will not slip out of his hands unintentionally (also in case of sudden pull from the dog) and at the same time is free to use the hand of the arm inserted in such a handle.

Considering that the new leash of the invention can be efficaciously held with the forearm, it is easy to understand that it is an advantageous solution to the additional drawbacks of the prior art.

The above is true not only because it protects the users wrist and hand against the aforementioned stress on muscles and joints, but also because it allows the user to control the dog while keeping both hands in his pockets in case of very low temperatures during the coldest months.

Aside from the latter consideration, it must be noted that the level of comfort for the users hand of the leash of the invention is additionally increased because the annular handle is designed to contain an electrically-powered heating means (possibly an electrical resistance with batteries) to maintain the external surface warm.

Another purpose of the present invention is, unlike the prior art, to allow the user to fix the leash easily and rapidly to any occasional fixing point, whenever the user intends to renounce the animal's direct control for a short period of time.

For such a reason the basically annular handle of the leash of the invention is provided with articulated structure formed of two identical semi-circular sections that can be uncoupled and separated.

Practically, the two semi-circular sections can be considered as a pair of claws, since their back ends are pivoted on opposite sides to the short pipe incorporated into the box-shaped body that contains the cord-winding roll.

The front ends of the two semi-circular sections are designed to be brought in contact one against the other to give continuity to the annular structure of the handle that is formed by them, and at the same time they can be separated by taking advantage of their autonomous capability of rotating by 360° with respect to their pivoting pin.

When the user intends to park his dog for a short period of time, he must separate the two sections of the annular handle by means of mutual rotation to allow for inserting a light post, a rod of a bench or a metal section of a railing through their opening.

Then the user must simply bring the separable sections back together in order to restore the continuity of the annular structure of the handle and close them behind said occasional fixing point. The above ensures that the leash of the invention cannot be detached, even in case of the dog's energetic traction, unless the semi-circular sections that act as claws are separated again.

A last purpose of the present invention is to reduce the volume of the leash of the invention, in spite of high versatility and functionality, when it is not used, and therefore not only during preliminary packaging or storage before sale, but also at the final user's domicile.

As mentioned above, the circular box-shaped body that contains the cord-winding roll is pivoted at the opposite back ends of said basically annular handle.

This is done to guarantee that the same box-shaped body can rotate between the ends of the handle.

This allows for passing from an "external" position, in which it is hung to the handle, to an "internal" position, in which it is exactly engaged inside the handle.

In particular, the "external" position must be adopted by the box-shaped body when the entire leash is in operational condition, whereas the "internal" position must be adopted to reduce the total volume of the leash when it is in idle position.

Moreover, the fact that the box-shaped body can rotate freely between the two ends of the handle is also advantageous for another reason.

In fact, the box-shaped body can spontaneously change its orientation with respect to the handle, according to the traction force exerted by the animal.

This condition reduces the effort necessary to hold the handle and the consequent friction on the user's hand.

Finally, it must be noted that, compared to the prior art, the adoption of said annular handle with large dimensions has also involved the introduction of different modes with regard to the assembly and operation of the button used to stop and release the cord-winding roll contained inside the box-shaped body of the leash of the invention.

For purposes of clarity, the description of the invention continues with reference to the enclosed drawings, which are intended for purposes of illustration only and not in a limiting sense, wherein.

Figure 1:
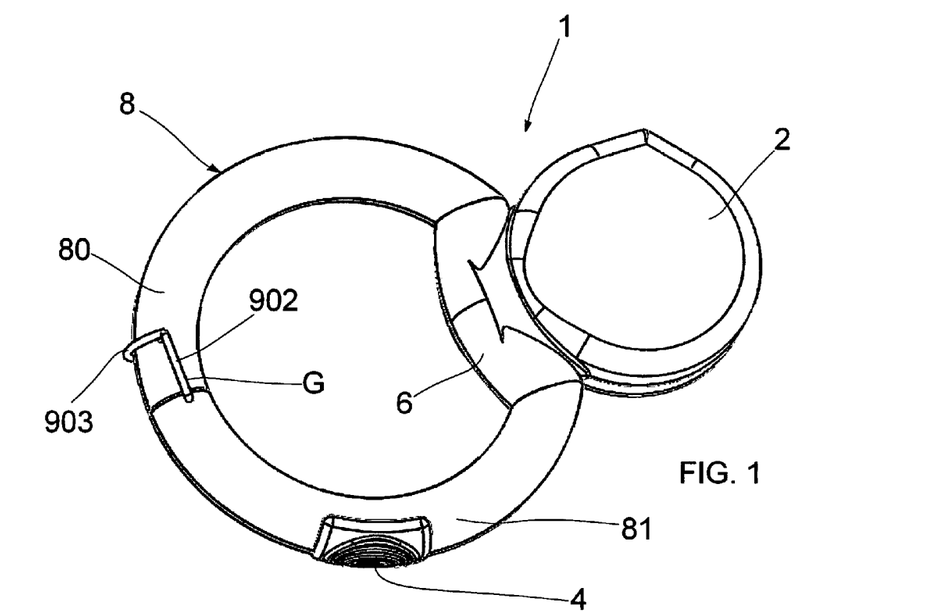
FIG. 1 is an axonometric view of the leash of the invention in operational position.
Figure 2:
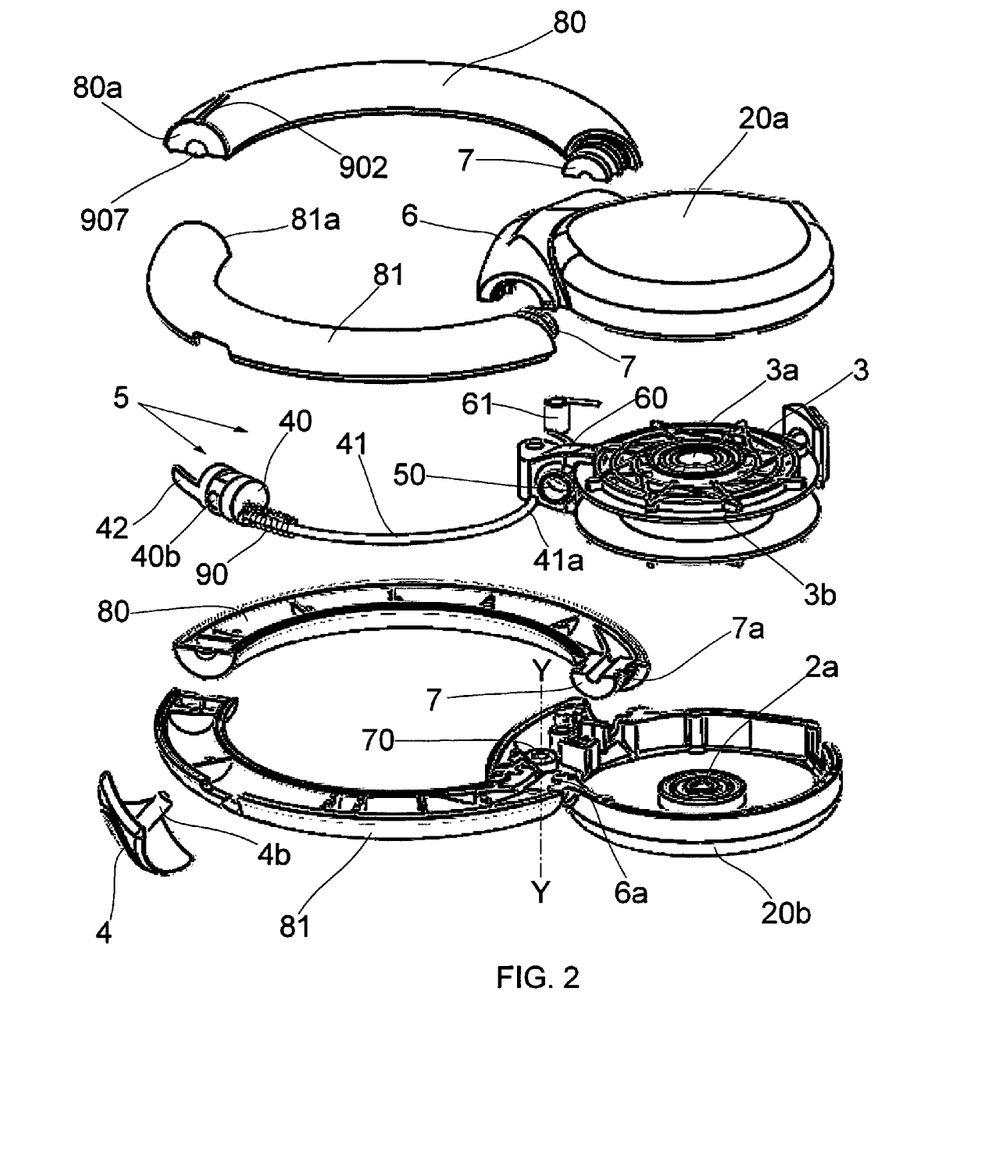
FIG. 2 is an exploded axonometric view of the leash of the invention.

Referring to FIGS. 1 and 2, the leash of the invention (1), which is preferably obtained from molding plastic materials, comprises a basically circular box-shaped body (2), with respect to which the cord designed to be attached to the animal's collar can be wound or unwound.

The box-shaped body (2) is formed of two identical cooperating semi-shells (20a, 20b) and is designed to contain a traditional cord-winding pulley (3), the central hole (3a) of which is coupled with the pins (2a) that protrude centrally on the inside of the semi-shells (20a, 20b).

The cord attached to the dog is unwound from the perimeter groove of the pulley (3) by means of the simple traction exerted by the animal, whereas spontaneous winding is generated by a return spring (not shown in the enclosed drawings) provided on the pulley (3).

Normally, the rotation of the pulley (3) can be stopped and released by means of a button (4) that operates with the interposition of suitable return means (5).

The peculiarity of said box-shaped body (2) consists in the fact that it incorporates a basically rectilinear short pipe (6) in external position on a section of its circumference, at the ends of which the pins (7) of a large handle (8) with open annular profile and circular or elliptical cross-section are inserted.

The coupling between the pins (7) of the handle (8) and the ends of the pipe (6) of the box-shaped body (2) is such that the box-shaped body (2) can rotate freely by 360° around the handle (8).

More precisely, the pins (7) are perimetrally provided with two circular projections (7a) designed to be exactly engaged inside corresponding grooves (6a) provided inside said ends of the pipe (6).

In order not to interfere with the rotation of the circular box-shaped body (2) its diameter is lower than the internal diameter of the handle (8).

Moreover, it must be noted that the annular profile given to the handle (8) has required a specific solution to obtain said interaction between the 20 hold-and-release button (4) and the pulley (3).

Referring to FIG. 2, the return means (5) that cooperate with the button (4) and allow stop/release the cord-winding pulley (3) consist in a monolithic cylindrical cursor (40) associated with a flexible cable (41) on one side and with an arched claw (42) on the other side.

The flexible cable (41) ends with a point (41a) that is constantly inserted into a conical blind seat (50) situated on the retention hook (60) of the pulley (3).

Such a hook (60) is pivoted with respect to a housing (70) obtained inside the pipe (6), in such a way to oscillate with respect to an axis (Y) orthogonal to the axis of rotation of the pins (7) of the handle (8).

The hook (60) is constantly subject to the action of a spiral spring (61) that holds it in end-of-travel position, in which it does not interfere with the radial arms (3b) of the pulley (3) that remains free to rotate around the pins (2a).

Under the thrust of the button (4), the point (41a) of the cable (41) causes the rotation of the hook (60) with respect to said axis (Y), overcoming the contrast force of said return spring (61).

Following to said thrust, the hook (60) interferes with the radial arms (3b) of the pulley (3), stopping its rotation in the direction that corresponds to cord unwinding.

The forward travel of the cursor (40) encounters resistance in a corresponding return spring (90) inserted along the cable (41).

Therefore, when the user's thrust on the button (4) ends, the cursor (40) is recalled directly by the spring (90) and indirectly by the spiral spring (61) that spontaneously discharges its thrust on the hook (60).

Moreover, it must be noted that the arched claw (42) of the cursor (40) carries out a guide and centering function inside the handle (8) for the alternate travels of the latter.

FIGS. 4A to 4D show the operation modes of said button (4).

Figure 4A:
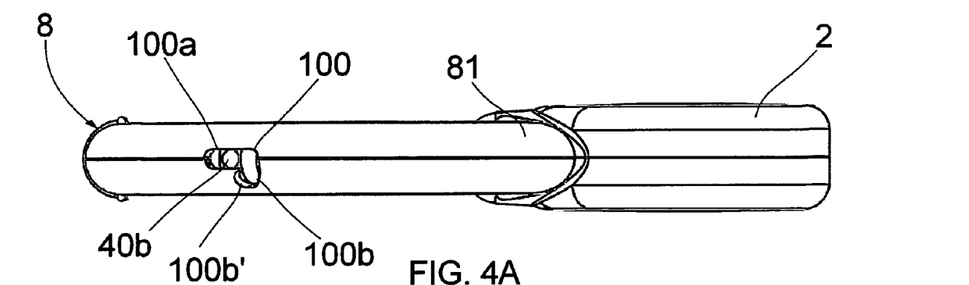
FIGS. 4A-4D show the operation modes of the button that actuates and stops the cord-winding disc of the leash of the invention.

First of all, as shown in FIG. 4A, the handle (8) is provided on one of its external sides with an L-shaped central notch (100) that is formed of a longitudinal section (100a) with upper end facing the top of the handle (8), whereas the lower end faces the box-shaped body (2); it being provided that the lower end is joined with the transversal section (100b) of the notch (100).

The notch (100) is crossed by a short stem (4b) that protrudes on the inside of said button (4) in such a way to be exactly engaged into a corresponding hole (40b) provided on the cylindrical cursor (40).

The button (4) is practically composed of a mobile plate that slides along the external surface of the handle (8) in such a way that its travels can guide the travels of the stem (4b) inside the notch (100).

The plate is externally provided with projections that act as friction surface to improve the interference that the user's thumb must produce to cause the necessary travels with respect to said L-shaped notch (100).

Figure 4B:
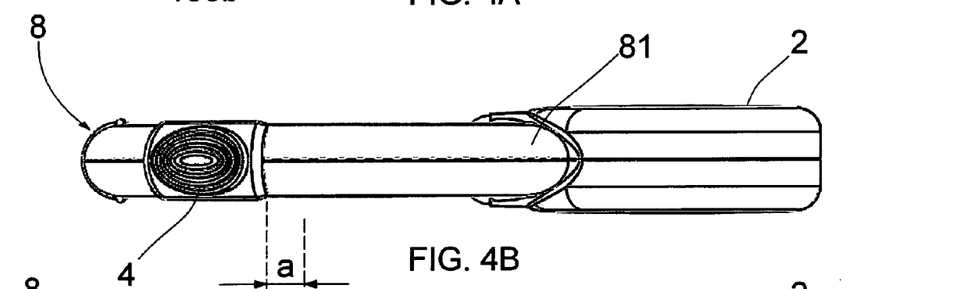

Referring to FIG. 4B, the idle position of the button (4) is the maximum retraction position, when it is situated at the maximum distance from the box-shaped body (2), whereas the stem (4b), together with the cursor (40) joined to it, is maintained at the height of the upper end of the longitudinal section (100a) of the notch (100).

In such a situation, the pulley (3) contained inside the box-shaped body (2) is free to rotate forward because of the traction exerted by the dog on the cable fixed to it.

Figure 4C:
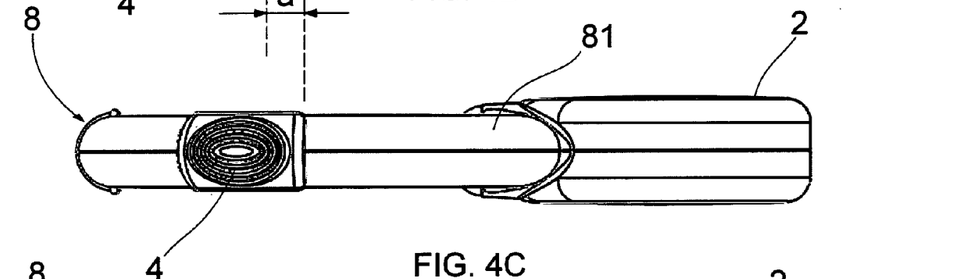

FIG. 4C shows the button (4) in the maximum advance position—after a forward travel (a)—when the stem (4b) is brought in correspondence with the lower end of the longitudinal section (100a) of the notch (100).

In such a case the pulley (3) is temporarily stopped, and remains stopped only if the interference of the user's thumb on the button (4) continues.

Figure 4D:
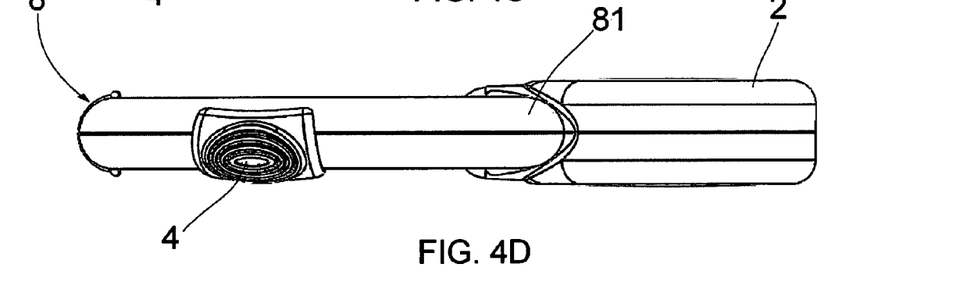

FIG. 4D shows the button (4) in lateral translated position, when the stem (4a) is inserted into the transversal section (100b) of the notch (100).

The effect of such an insertion is to obtain the permanent stop of the pulley (3) that is maintained also if the interference of the user's thumb on the button (4) ends.

In order to avoid the accidental uncoupling of the stem (4b) from the transversal section (100b) of the notch (100) obtained on the handle (8), the transversal section (100b) is provided with a bend (100b') in which the stem (4b) is inserted and engaged under the pressure of said spring (90) in compressed condition.

Because of the need to contain both the cursor (40) and the cable (41), the handle (8) is provided with internally empty tubular structure.

According to the preferred embodiment shown in the enclosed figures, the handle (8) is formed of two basically C-shaped semi-parts (80, 81), which are similar and opposite.

The two semi-parts (80, 81) incorporate the axial rotational pins (7) at the back ends (7), whereas the front ends (80a, 81a) are provided with coupling means in order to allow for stable fixing necessary to give continuity to said open annular profile of the entire handle (8).

Figure 3:
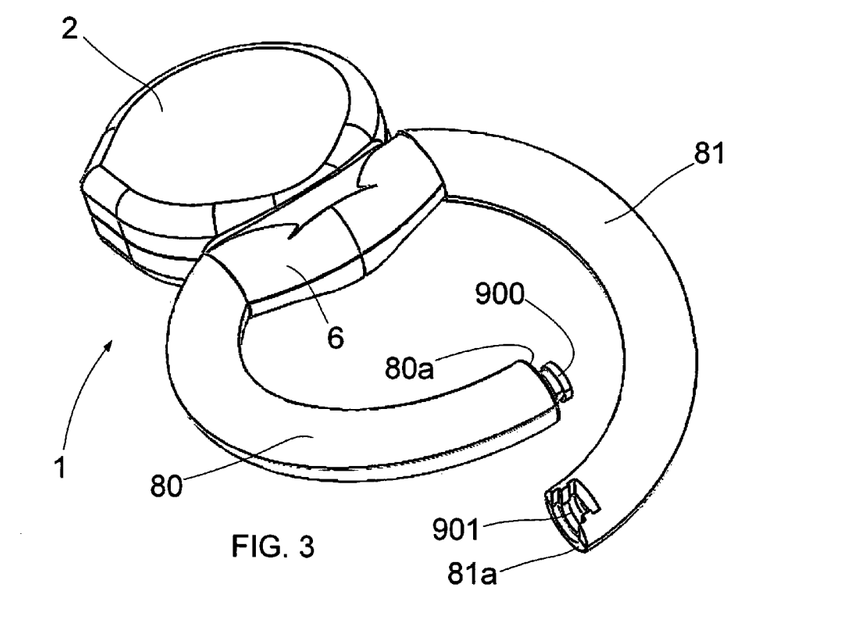
FIG. 3 is an axonometric view that shows the two halves of the handle of the leash of the invention in separate position.

Referring to FIG. 3, the possibility of separating (with cutting force) and closing the two semi-parts (80, 81) has been provided in order to allow them to operate as two claws with respect to a post or bar where the leash of the invention (1), together with the animal, is to be temporarily fixed.

Practically, the secure fixing of the two semi-parts (80, 81) is guaranteed when the free ends (80a, 81a) are brought into contact by two magnets (M) suitably engaged inside them.

In order to guarantee higher stability and magnetic coupling, the two semi-parts (80, 81) provide male-female coupling, according to the description below.

Figure 5:
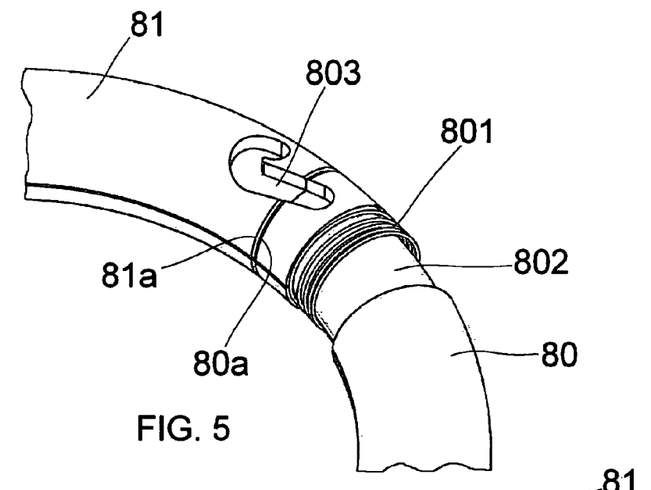
FIGS. 5, 5A and 5B are axonometric views that show the solution adopted to ensure the stable fixing of the two halves of the handle of the leash of the invention.
Figure 5A:
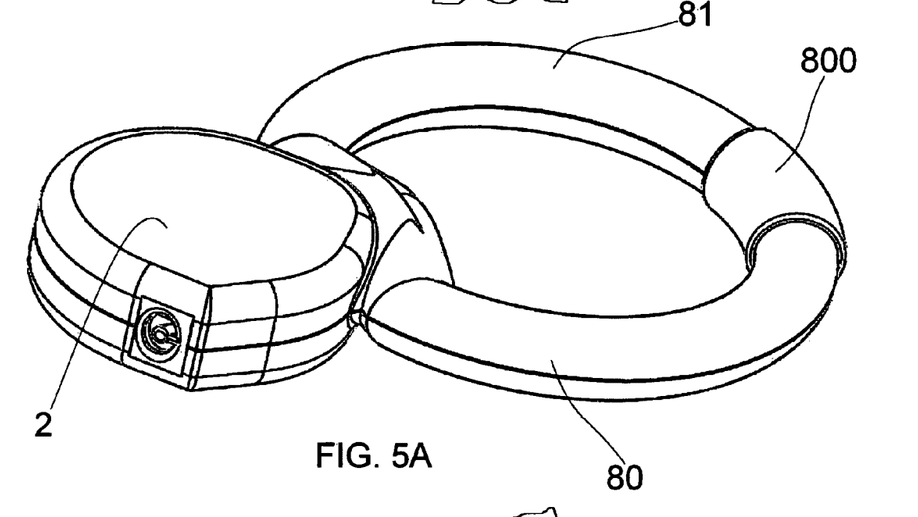
Figure 5B:
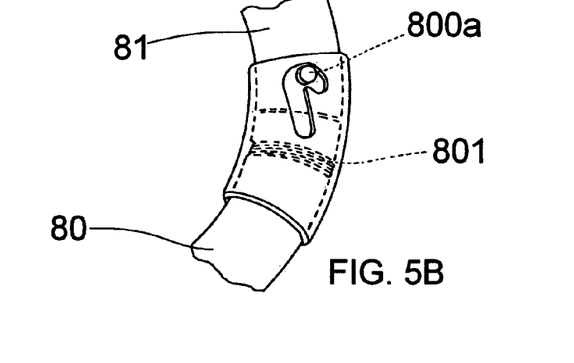

FIGS. 5, 5A and 5B show another device that has been devised in order to stabilize the coupling of the two semi-parts (80, 81); in particular, it is a technical solution that pursues such a purpose also when the aforementioned magnets are not inserted in the two semi-parts (80, 81).

A sleeve (800) is inserted in the end section of the first semi-part (80) and continuously subject to a forward thrust discharged by a helicoidal spring (801) inserted in a perimeter groove (802) obtained near the free end (80a).

The thrust of the spring (801) is such that, if it remains subject to its force, the sleeve (800) tends to partially protrude beyond the free end (80a) of the semi-part (80).

For this reason, in order to engage the two semi-parts (80, 81) one against the other, the sleeve (800) must be subject to a backward travel, overcoming the contrary force of the spring (801) so that the free ends (80a, 81a) of the semi-parts (80, 81) can be brought in mutual contact.

When the coupling is made, a special housing (803) is formed between the two semi-parts (80, 81) astride them with basically J-shaped profile, as shown in FIG. 5.

The sleeve (800) is internally provided with a peg (800a) adapted to exactly engage inside the housing (803).

Once the coupling between the two semi-parts (80, 81) has been completed, the sleeve (800) can be released and subject to the force of the spring (801) that tends to push it forwards.

Because of such a forward travel, the sleeve (800) also embraces the end section of the opposite semi-part (81), thus avoiding the risk that the end sections of the two semi-parts (80, 81) can be accidentally uncoupled under the effect of an accidental cutting force.

Now referring to FIG. 5B, the insertion of said peg (800a) of the sleeve (800) in the shortest section of the housing (803) generated during the forward travel of the sleeve (800) prevents it from moving backwards accidentally and eliminating the secure centering and connection function between the opposite sections of the two semi-parts (80, 81).

As shown in FIG. 3, the secure fixing of the opposite sections of the two semi-parts (80, 81) can be obtained also with a different technical-functional solution for male-female coupling.

According to such an alternative solution a cylindrical appendix with enlarged head (900), with a basically mushroom-shaped profile, protrudes axially from the centre of the free end (80a) of the first semi-part (80), which is designed to be exactly engaged inside a corresponding seat (901) provided with lateral access obtained starting from the free end (81a) of the second semi-part (81).

It appears evident that the adoption of the enlarged head allows the cylindrical appendix (900) of the first semi-part (80) to remain inside the seat (901) also in case of energetic backward traction exerted on it in axial direction.

Because of this, the opposite sides of the two semi-parts (80, 81) cannot be accidentally uncoupled, but the sleeve (800) that cooperates with the housing (803) positioned astride the two semi-parts (80, 81) can be used for higher safety purposes, regardless of the fact that said safety sleeve is not shown in the aforementioned FIG. 3.

Figure 6:
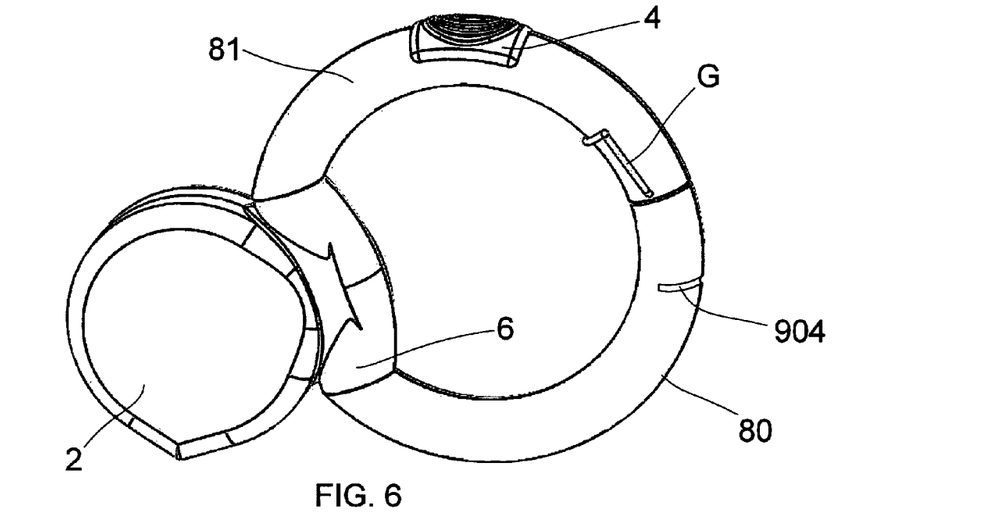
FIG. 6 is an additional axonometric view of the leash shown in FIG. 1.

FIGS. 1 and 6 show another solution that has been studied to prevent the accidental coupling of the two semi-parts (80, 81) because of accidental sliding in radial direction.

Also this solution can be used both without and with the aforementioned magnets that can be housed inside the free ends (80a, 81a) of the two semi-parts (80, 81).

In particular, said alternative safety means consists in a special fixing bracket (G) composed of two opposite arms (902) joined on top by a cross-piece (903) with curved profile that covers approximately half section of the handle (8).

The lower ends of the arms (902) of said bracket (G) are pivoted on opposite sides to the second semi-part (81) in a slightly more internal position with respect to the free end (81a).

FIG. 6 shows the same bracket (G) in non-operational position; FIG. 1 shows the same bracket (G) in operational position, when it acts to avoid the uncoupling between the two semi-parts (80, 81).

The passage of the bracket (G) from operational position to non-operational position (and vice versa) can only occur after uncoupling the two semi-parts (80, 81); in such a way, the bracket (G) is free to make the necessary rotation of about 180° starting from its operational position.

Then, the user must couple the two semi-parts (80, 81) again and engage the bracket (G) into a corresponding housing (904) outside the first semi-part (80). As mentioned above, the handle (8) must be internally empty to contain some parts adapted to interact with said winding roll (3).

To that end, each of the semi-parts (80, 81) is composed of two snap-in semi-shells, as shown in the exploded view of FIG. 2.

Figure 7:
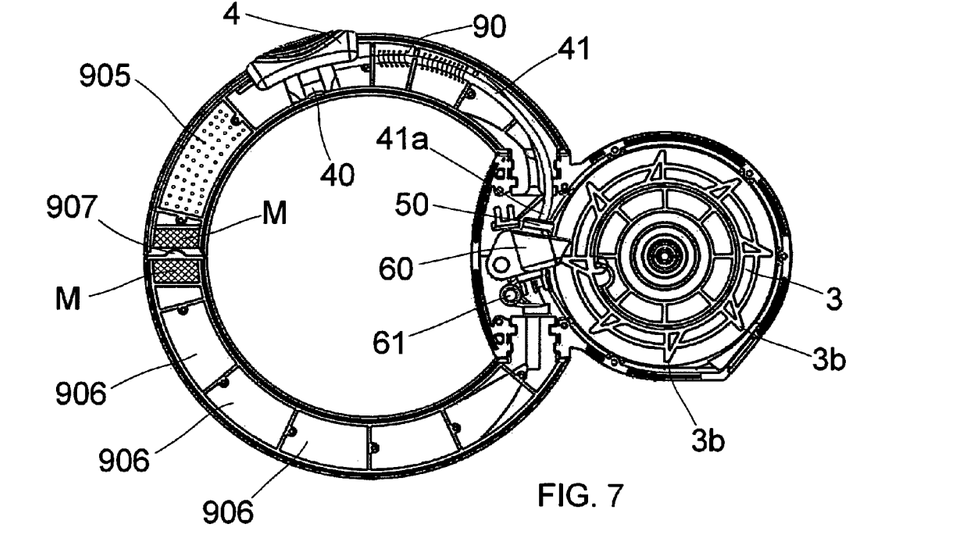
FIG. 7 is a cutaway of the leash of the invention showing the internal parts.

Such a device is especially advantageous in order to give the handle (8) the aforesaid self-heating function, as shown in FIG. 7.

One of the two semi-parts (81) can house one or more electrical heating devices (905)—preferably electrical resistances—whereas the other semi-part (80) can contain a corresponding series of power batteries (906).

The possibility to open the two semi-parts (80, 81) by uncoupling the semi-shells allows the final user of the leash of the invention (1) to easily replace the batteries (906) when they are exhausted.

The electrical connection between the batteries (906) and said one or more heating devices (905) is favored by the contact between two metal plates (907) positioned in the centre of the free ends (80a, 81a) of the two semi-parts (80, 81).

According to a preferred embodiment of the invention, each of said electrical heating devices (905) consists in an electric circuit composed of very thin copper filaments immersed in a conductive graphite paste spread inside the sleeve (8).

Of course, said heating devices can be activated and deactivated at the discretion of the user of the leash of the invention (1) by means of a switch (not shown in the enclosed drawings) controlled by a button installed in the handle (8).

The electrical connection, can also be made with a cable that crosses the empty handle (8) from one side to another.

The invention claimed is:

1. A leash for animals comprising:
    a handle;
    a box-shaped body housing a cord-winding pulley; and
    a basically rectilinear short pipe joined to said box-shaped body, wherein:
        said handle has an open annular profile and comprises two rotational pins configured to be inserted into corresponding housings in opposite sides of the basically rectilinear short pipe, the box-shaped housing thereby being configured to rotate 360 degrees around the rotational pins; and
        said handle further comprises a button in communication with said cord-winding pulley and configured to stop and release said cord-winding pulley.

2. The leash as claimed in claim 1, wherein said handle further comprises two C-shaped semi-parts, each C-shaped semi-part of said two C-shaped semi-parts comprising:
    one rotational pin of said two rotational pins at a first end; and
    a coupling component at a second end.

3. The leash as claimed in claim 2, wherein each said coupling component comprises one magnet of two cooperating magnets contained in the second ends of said two C-shaped semi-parts.

4. The leash as claimed in claim 2, further comprising a sliding sleeve configured to be inserted and slidable in a first C-shaped semi-part of the two C-shaped semi-parts, and further configured to simultaneously embrace the second ends of the two C-shaped semi-parts.

5. The leash as claimed in claim 4, wherein:
    the sleeve is configured to be subject to a thrust of a helicoidal spring positioned in the coupling component of the first C-shaped semi-part, the coupling component of the first C-shaped semi-part comprising a perimeter groove near the second end of the first C-shaped semi-part; and
    said sleeve comprises a peg configured to engage a basically J-shaped housing positioned astride the second ends of the two C-shaped semi-parts.

6. The leash as claimed in claim 2, wherein:
    a first coupling component of said coupling components comprises a cylindrical appendix with an enlarged head that axially protrudes from the center of the second end of a first C-shaped semi-part of the two C-shaped semi-parts, and
    a second coupling component of said coupling components comprises a corresponding seat on the second end of a second C-shaped semi-part of the two C-shaped semi-parts.

7. The leash as claimed in claim 2, wherein the two C-shaped semi-parts comprise a first C-shaped semi-part and a second C-shaped semi-part, wherein a first coupling component of said coupling components comprises a fixing bracket formed of two opposite arms pivoted on opposite sides to the second C-shaped semi-part of the two C-shaped semi-parts and an upper cross-piece with a profile compatible with a section of the handle and adapted to be exactly engaged into a corresponding second coupling component of said coupling components, the second coupling component comprising a seat on an outside surface of the first C-shaped semi-part of the two C-shaped semi-parts.

8. The leash as claimed in claim 1, wherein said handle houses one or more electrical devices adapted to heat the external surface, together with a power supply.

9. The leash as claimed in claim 8, wherein said one or more electrical devices comprises an electrical resistor and the power supply is electrical batteries.

10. The leash as claimed in claim 9, wherein said electrical resistor comprises an electric circuit composed of very thin copper filaments immersed in a conductive graphite paste spread inside the handle.

11. The leash as claimed in claim 2, wherein each C-shaped semi-part of said two C-shaped semi-parts comprises two snap-in semi-shells.

12. The leash as claimed in claim 1, wherein said box-shaped body comprises two identical cooperating semi-shells, each semi-shell being internally provided with a pin adapted to be inserted in holes of the cord-winding pulley.

13. The leash as claimed in claim 1, wherein the button is in communication with the cord-winding pulley by a monolithic cylindrical cursor associated with an arched claw on one side and with a flexible cable, the flexible cable ending with a point constantly inserted into a conical blind housing situated on a retention hook of the cord-winding pulley.

14. The leash as claimed in claim 13, wherein said retention hook is pivoted with respect to a housing in the basically rectilinear short pipe, in such a way to oscillate with respect to an axis orthogonal to an axis of the rotational pins of the handle.

15. The leash as claimed in claim 13, further comprising a return spring positioned along the cable of the cursor and adapted to maintain the cursor in an idle position.

16. A leash for animals comprising:
a hollow handle;
a box-shaped body housing a cord-winding pulley; and
a basically rectilinear short pipe joined to said box-shaped body, wherein said hollow handle has an open annular profile and comprises two rotational pins configured to be inserted into corresponding housings in opposite sides of the basically rectilinear short pipe, the box-shaped body thereby being configured to rotate 360 degrees around the rotational pins.

17. The leash as claimed in claim 16, wherein said hollow handle comprises two C-shaped semi-parts, each C-shaped semi-part of said two C-shaped semi-parts comprising:
one rotational pin of said two rotational pins at a first end; and
a coupling component at a second end.

18. The leash as claimed in claim 17, wherein the two C-shaped semi-parts comprise a first C-shaped semi-part and a second C-shaped semi-part, wherein a first coupling component of said coupling components comprises a fixing bracket formed of two opposite arms pivoted on opposite sides to the second C-shaped semi-part of the two C-shaped semi-parts and an upper cross-piece with a profile compatible with a section of the hollow handle and adapted to be exactly engaged into a corresponding second coupling component of said coupling components, the second coupling component comprising a seat on an outside surface of the first C-shaped semi-part of the two C-shaped semi-parts.

19. The leash as claimed in claim 17, wherein each C-shaped semi-part of said two C-shaped semi-parts comprises two snap-in semi-shells.

20. The leash as claimed in claim 16, wherein said box-shaped body comprises two identical cooperating semi-shells, each semi-shell being internally provided with a pin adapted to be inserted in holes of the cord-winding pulley.

\* \* \* \* \*